(12) United States Patent
Nowatari et al.

(10) Patent No.: US 8,420,275 B2
(45) Date of Patent: Apr. 16, 2013

(54) COMPOSITE MEMBRANE, FUEL CELL, AND METHOD FOR FABRICATING THE COMPOSITE MEMBRANES

(75) Inventors: Yuko Nowatari, Kobe (JP); Takahiro Isono, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 392 days.

(21) Appl. No.: 12/750,165

(22) Filed: Mar. 30, 2010

(65) Prior Publication Data

US 2010/0248075 A1    Sep. 30, 2010

(30) Foreign Application Priority Data

Mar. 30, 2009  (JP) ................................. 2009-082961
Feb. 9, 2010   (JP) ................................. 2010-026673

(51) Int. Cl.
    *H01M 8/10*       (2006.01)
(52) U.S. Cl.
    USPC .......................................... 429/483; 429/463
(58) Field of Classification Search .................. None
    See application file for complete search history.

(56) References Cited

U.S. PATENT DOCUMENTS

| | | | |
|---|---|---|---|
| 2004/0018415 A1* | 1/2004 | Lai et al. .......................... | 429/40 |
| 2004/0091767 A1* | 5/2004 | Zuber et al. ...................... | 429/40 |
| 2004/0151961 A1* | 8/2004 | Morishima et al. ............. | 429/32 |
| 2006/0194088 A1 | 8/2006 | Kabumoto | |
| 2006/0269828 A1* | 11/2006 | Tanaka et al. ................... | 429/44 |
| 2008/0220307 A1 | 9/2008 | Fukushima et al. | |
| 2009/0246593 A1* | 10/2009 | Nowatari et al. ............... | 429/33 |

FOREIGN PATENT DOCUMENTS

| | | |
|---|---|---|
| JP | 2005-216769 | 8/2005 |
| JP | 2006-244715 | 9/2006 |
| JP | 2008-258142 | 10/2008 |

* cited by examiner

*Primary Examiner* — John S Maples
(74) *Attorney, Agent, or Firm* — McDermott Will & Emery LLP

(57) ABSTRACT

Electro membrane assemblies are formed respectively in openings provided in a substrate. Each membrane electrode assembly is provided with an electrolyte membrane, an anode catalyst layer, and a cathode catalyst layer. A protective layer is provided on the substrate disposed between the adjacent anode catalyst layers. The other protective layer is provided on the substrate disposed between the adjacent cathode catalyst layers. The protective layer and the other protective layer preferably contain a resin whose number of C—F bonds is greater than that of the substrate.

10 Claims, 12 Drawing Sheets

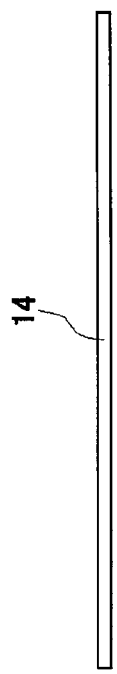
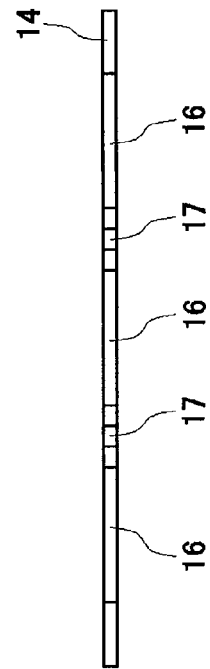
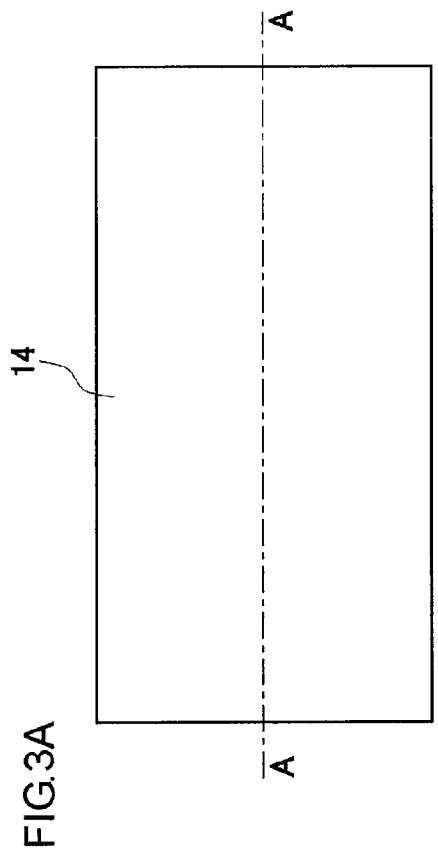
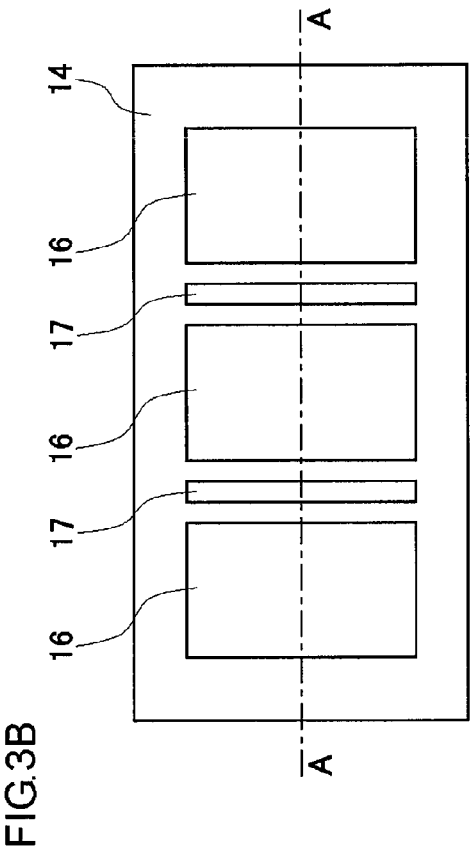
FIG.3A
FIG.3B

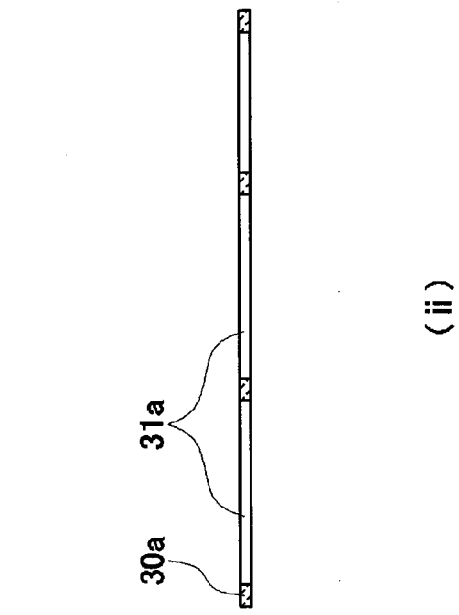
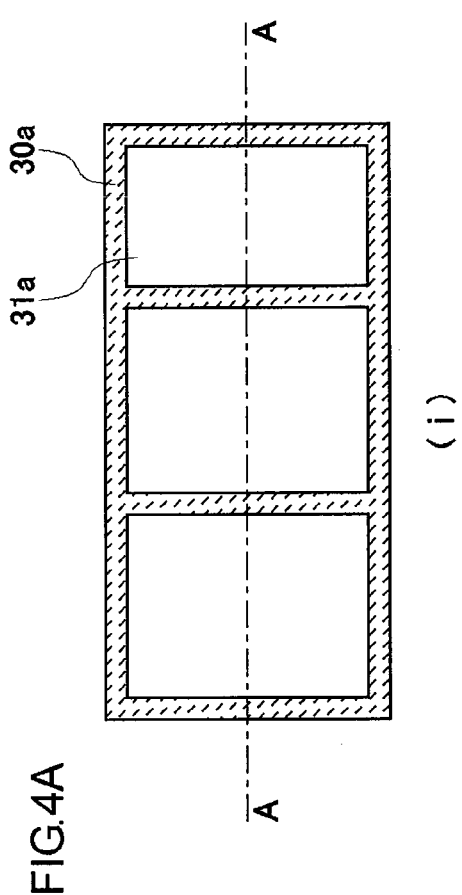
FIG.4A
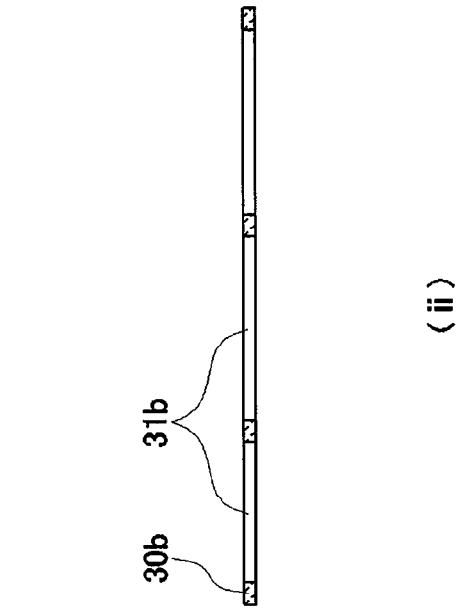
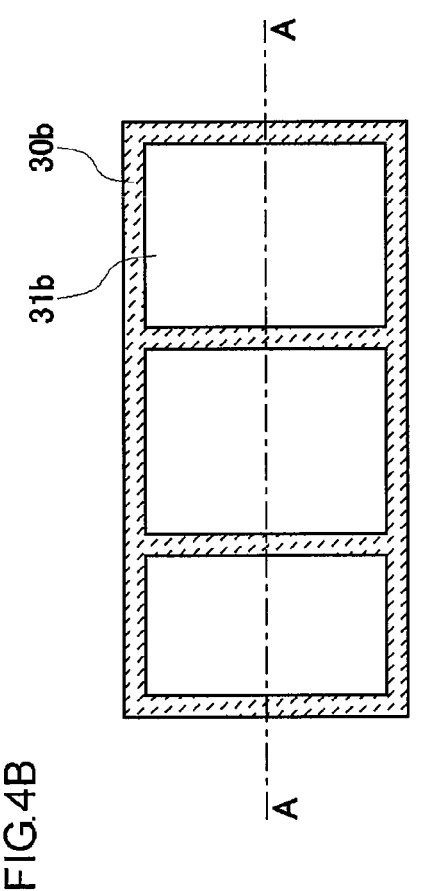
FIG.4B

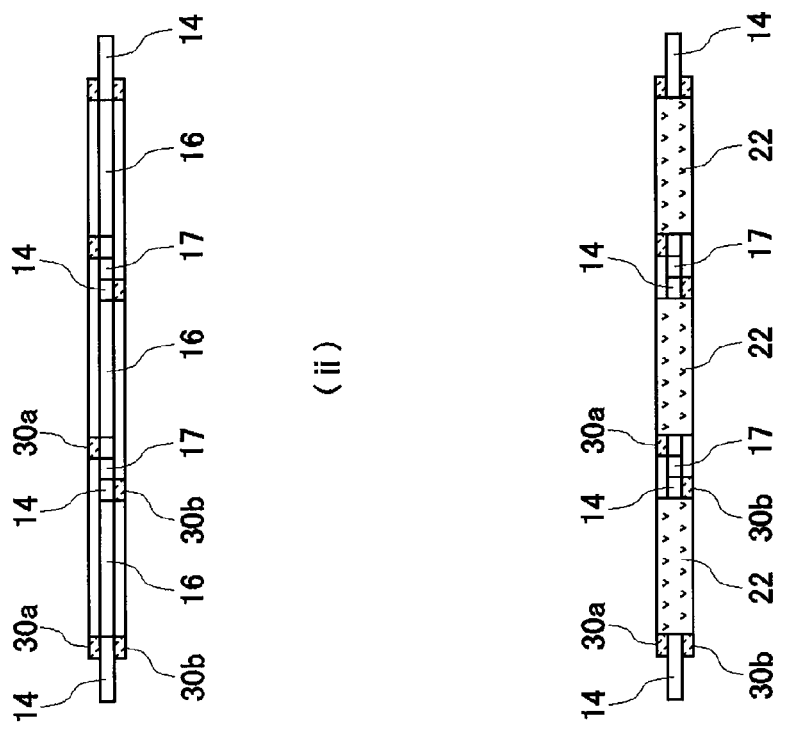
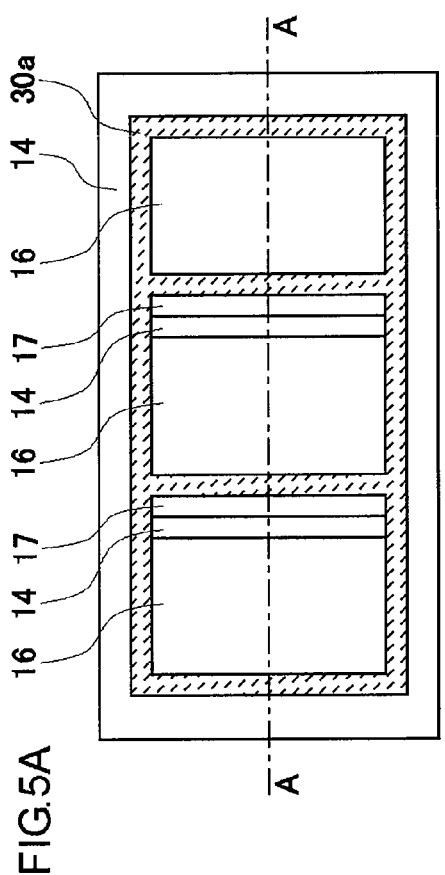
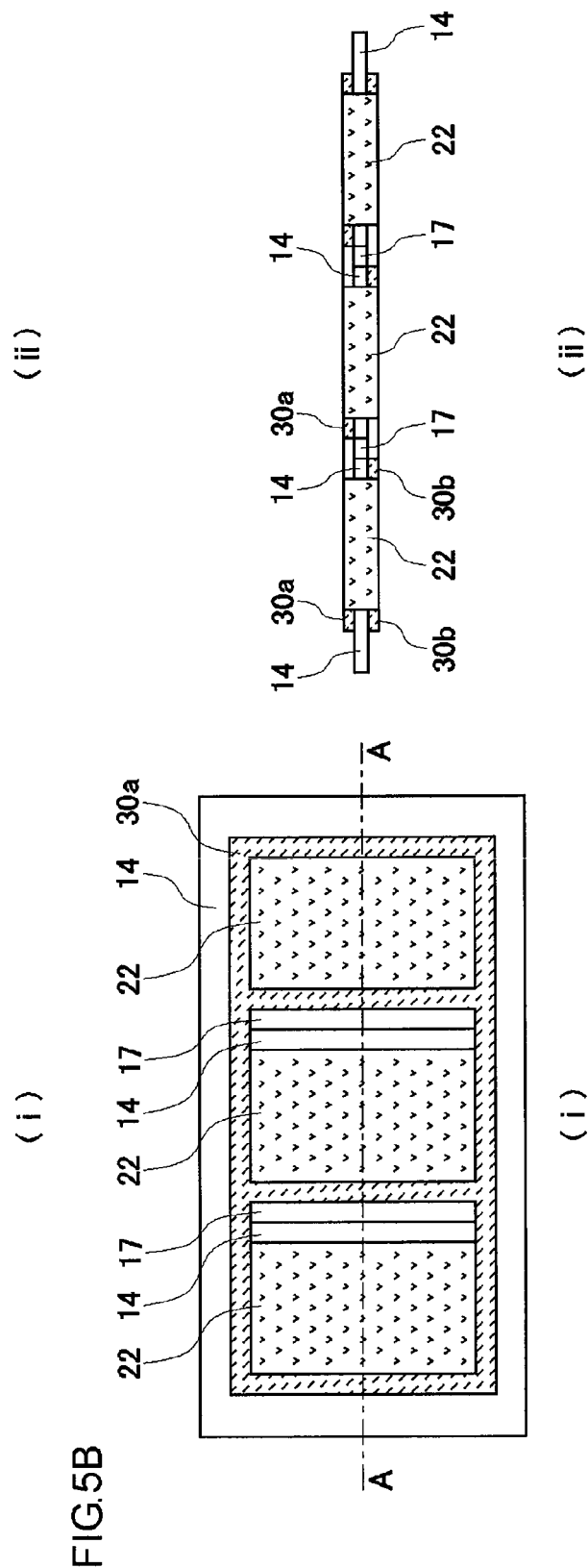

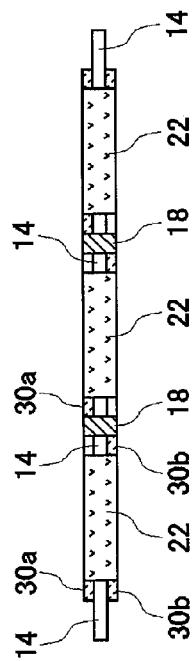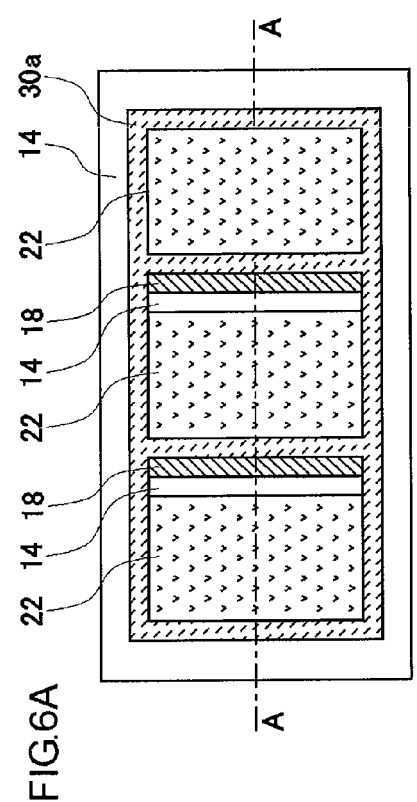
FIG.6A
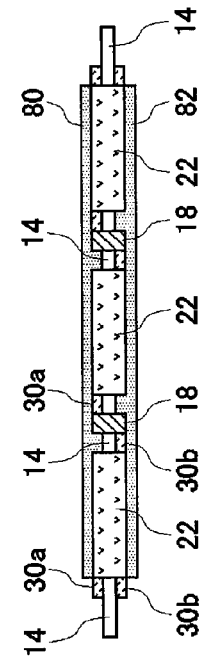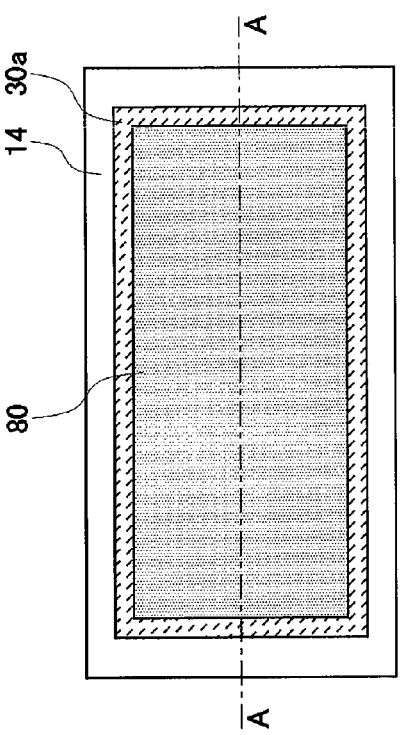
FIG.6B

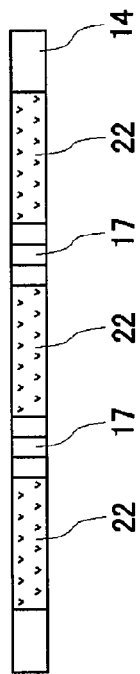
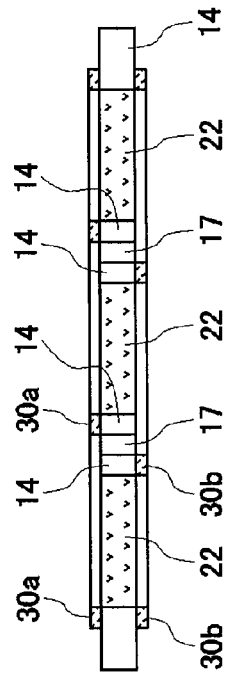
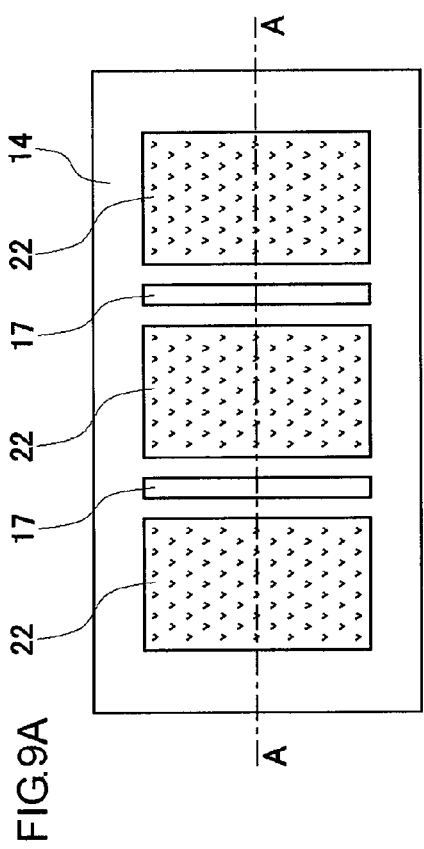
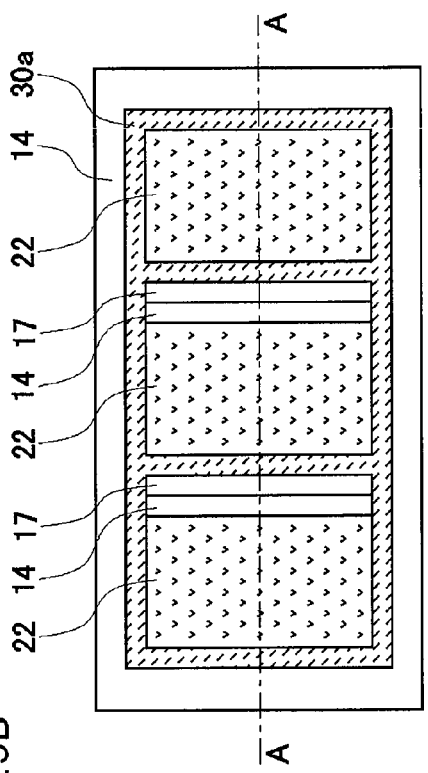
FIG.9A
FIG.9B

COMPOSITE MEMBRANE, FUEL CELL, AND METHOD FOR FABRICATING THE COMPOSITE MEMBRANES

CROSS-REFERENCE TO RELATED APPLICATIONS

This application is based upon and claims the benefit of priority from the prior Japanese Patent Applications No. 2009-82961, filed on Mar. 30, 2009, and Japanese Patent Applications No. 2010-26673, filed on Feb. 9, 2010, the entire contents of which are incorporated herein by reference.

BACKGROUND OF THE INVENTION

1. Field of the Invention

The present invention relates to a fuel cell. More particularly, the invention relates to a fuel cell with its cells disposed in a planar arrangement.

2. Description of the Related Art

A fuel cell is a device that generates electricity from hydrogen and oxygen so as to obtain highly efficient power generation. A principal feature of a fuel cell is its capacity for direct power generation which does not undergo a stage of thermal energy or kinetic energy as in conventional power generation. This presents such advantages as high power generation efficiency despite the small scale setup, reduced emission of nitrogen compounds and the like, and environmental friendliness on account of minimal noise or vibration. A fuel cell is capable of efficiently utilizing chemical energy in its fuel and, as such, environmentally friendly. Fuel cells are therefore envisaged as an energy supply system for the twenty-first century and have gained attention as a promising power generation system that can be used in a variety of applications including space applications, automobiles, mobile devices, and large and small scale power generation. Serious technical efforts are being made to develop practical fuel cells.

In particular, polymer electrolyte fuel cells feature lower operating temperature and higher output density than the other types of fuel cells. In recent years, therefore, the polymer electrolyte fuel cells have been emerging as a promising power source for mobile devices such as cell phones, notebook-size personal computers, PDAs, MP3 players, digital cameras, electronic dictionaries or electronic books. Well known as the polymer electrolyte fuel cells for mobile devices are planar fuel cells, which have a plurality of single cells arranged in a plane. As a conventional method for arranging a plurality of single cells in a plane, a base material (substrate) is used and a plurality of through-holes are provided in this base material which is a nonelectrolyte. And these through-holes are filled with electrolytes to fabricate planar fuel cells using a composite membrane. The use of the base material makes it possible to use an electrolyte whose proton conductivity is high but whose mechanical strength is weak. Also, the use of the base material reduces the electrolyte part as much as possible, thereby reducing the cost.

To reduce the size of the planar fuel cell, the interval (spacing) between cells must be narrowed. For example, a technique using a laser processing is known as a method for narrowing the interval between them. In this technique, a catalyst layer of normal membrane electrode assembly is partially removed by the use of laser beams so as to fabricate a planar fuel cell.

A resin film which is highly chemical-resistant and excels in the dimensional stability may be used as a material for the substrate.

As a fuel to be used for this type of fuel cells, hydrogen stored in a hydrogen storage alloy or a hydrogen cylinder, as well as methanol, is the subject of continuing investigations.

The amount of electric power generated by planar fuel cells varies depending on the total area of electrodes. As for the voltage, on the other hand, the voltage produced thereby varies depending on the number of cells connected in series. Accordingly, to reduce the size of the fuel cell while the required power and voltage are assured, the number of cells connected in series needs to be increased and the interval between adjacent single cells needs to be shortened. At the same time, as the spacing between the single cells gets smaller, the problem of possible short-circuiting between adjacent catalyst layers must be addressed.

To form single cells with a fine interval therebetween in the planar fuel cells using a composite membrane, the interval between the adjacent through-holes provided in the substrate needs to be as short as possible. Accordingly, the microfabrications of substrate and catalyst layers need to be performed. A method of laser processing, punching with a metallic mold or the like is used as the microfabrication of substrate. Though the laser processing proves useful when the microfabrication is performed on the catalyst layers, the substrate may be damaged when the catalyst layers are irradiated with laser and the substrate may sometimes be cracked. When any crack is caused, there is a problem where hydrogen leaks with the hydrogen used as a fuel and therefore the performance of the fuel cell degrades.

Though the leak of hydrogen may be prevented by increasing the thickness of the substrate, the thickness of an electrolyte filling the substrate increases, which causes a problem of degraded performance of the fuel cell. When the laser beams used for processing the catalyst layers transmit through the substrate with the laser irradiated from one side only, a catalyst layer formed in the back with the composite membrane interposed between the catalyst layers is also removed. This causes another problem, for instance, when the area of anode and cathode electrodes in the single cell is to be changed.

SUMMARY OF THE INVENTION

The present invention has been made in view of the foregoing problems, and a purpose thereof is to provide a technology capable of narrowing the cell interval in a planar fuel cell where cells are arranged in a plane. Also, another purpose thereof is a technology capable of narrowing the cell interval by processing only one of catalyst layers, while damage to a substrate being restricted, in a planar fuel cell where cells are disposed in a planar arrangement using a composite membrane.

One embodiment of the present invention relates to a composite membrane used for a fuel cell. The composite membrane comprises: an insulating substrate having a plurality of openings; a membrane electrode assembly, disposed in each of the plurality openings, having an electrolyte membrane containing ionomer, a first catalyst layer provided on one face of the electrolyte membrane, and a second catalyst layer provided on the other face of the electrolyte membrane; and an insulating protective layer provided, for each membrane electrode assembly, on at least one of a first catalyst layer side of the substrate in between the adjacent first catalyst layers and a second catalyst layer side, disposed counter to the first catalyst layer side, of the substrate in between the adjacent second catalyst layers.

According to the present embodiment, the protective layers can enhance the insulation property between the adjacent membrane electrode assemblies in the composite membrane into which the membrane electrode assemblies are incorporated. As a result, even if the interval between the adjacent electrode membrane assemblies, namely the interval between the adjacent cells, is narrowed, the occurrence of shorts between the adjacent cells will be suppressed. Also, where the catalyst layer of each cell undergoes a microfabrication using laser beams, a region thereof where the protective layer is provided is irradiated with laser beams. This can suppress the substrate from being damaged by laser. Also, the protective layer blocks off the laser beams used for microfabrication of the catalyst layers, so that only one of catalyst layers can be processed.

In the composite membrane according to above-described embodiment, the protective layer may contain a resin whose number of C—F bonds is greater than that of the substrate. The protective layer may be made of a resin for which the transmission factor of laser beams used for microfabrication of the catalyst layers is 23% or less. Also, the protective layer may have a lower transmission factor of laser beams used for microfabrication of the catalyst layers than that of the substrate.

Another embodiment of the present invention relates to a fuel cell. The fuel cell may have a composite membrane according to any one of the above-described embodiments.

Still another embodiment of the present invention relates to a method for fabricating a composite membrane for a fuel cell. The method comprises: (1) forming an electrolyte membrane in each of a plurality of openings provided in an insulating substrate; (2) forming an insulating protective layer between the adjacent openings; forming a catalyst layer on at least one face of the substrate in such a manner as to lie across the plurality of electrolyte membranes; and irradiating the catalyst layer, corresponding to a region of the protective layer provided between the adjacent openings, with laser beams so as to be removed after the forming a catalyst layer, wherein the order in which the forming (1) and the forming (2) are carried out is arbitrary.

By employing the method, for fabricating a composite membrane, according to the above-described embodiment, the protective layer is held between the catalyst layer and the substrate in a region of the catalyst layer processed by laser, thereby preventing the substrate from being damage by laser.

In the above-described method for fabricating a composite membrane, the protective layer may contain a resin whose number of C—F bonds is greater than that of the substrate. Also, the protective layer may shield the laser beams used for microfabrication of the catalyst layer.

According to this embodiment, the occurrence of shorts between the adjacent catalyst layers is suppressed. Thus, the interval (spacing) between the catalyst layers can be further reduced. In other words, the distance between cells disposed in a planar arrangement can be shortened and therefore the size of a planar membrane electrode assembly can be further reduced.

Still another embodiment of the present embodiment relates also to a fuel cell. The fuel cell may have membrane electrode assemblies according to any one of the above-described embodiments.

It is to be noted that any arbitrary combinations or rearrangement of the aforementioned structural components and so forth are all effective as and encompassed by the embodiments of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIGS. 3A(i) to 3B(ii) are process diagrams showing a fabrication method of a composite membrane used for a fuel cell according to a first embodiment;

FIGS. 4A(i) to 4B(ii) are process diagrams showing a fabrication method of a composite membrane used for a fuel cell according to a first embodiment;

FIGS. 5A(i) to 5B(ii) are process diagrams showing a fabrication method of a composite membrane used for a fuel cell according to a first embodiment;

FIGS. 6A(i) to 6B(ii) are process diagrams showing a fabrication method of a composite membrane used for a fuel cell according to a first embodiment;

FIGS. 9A(i) to 9B(ii) are process diagrams showing a fabrication method of a composite membrane used for a fuel cell according to a second embodiment;

DETAILED DESCRIPTION OF THE INVENTION

Figure 1:
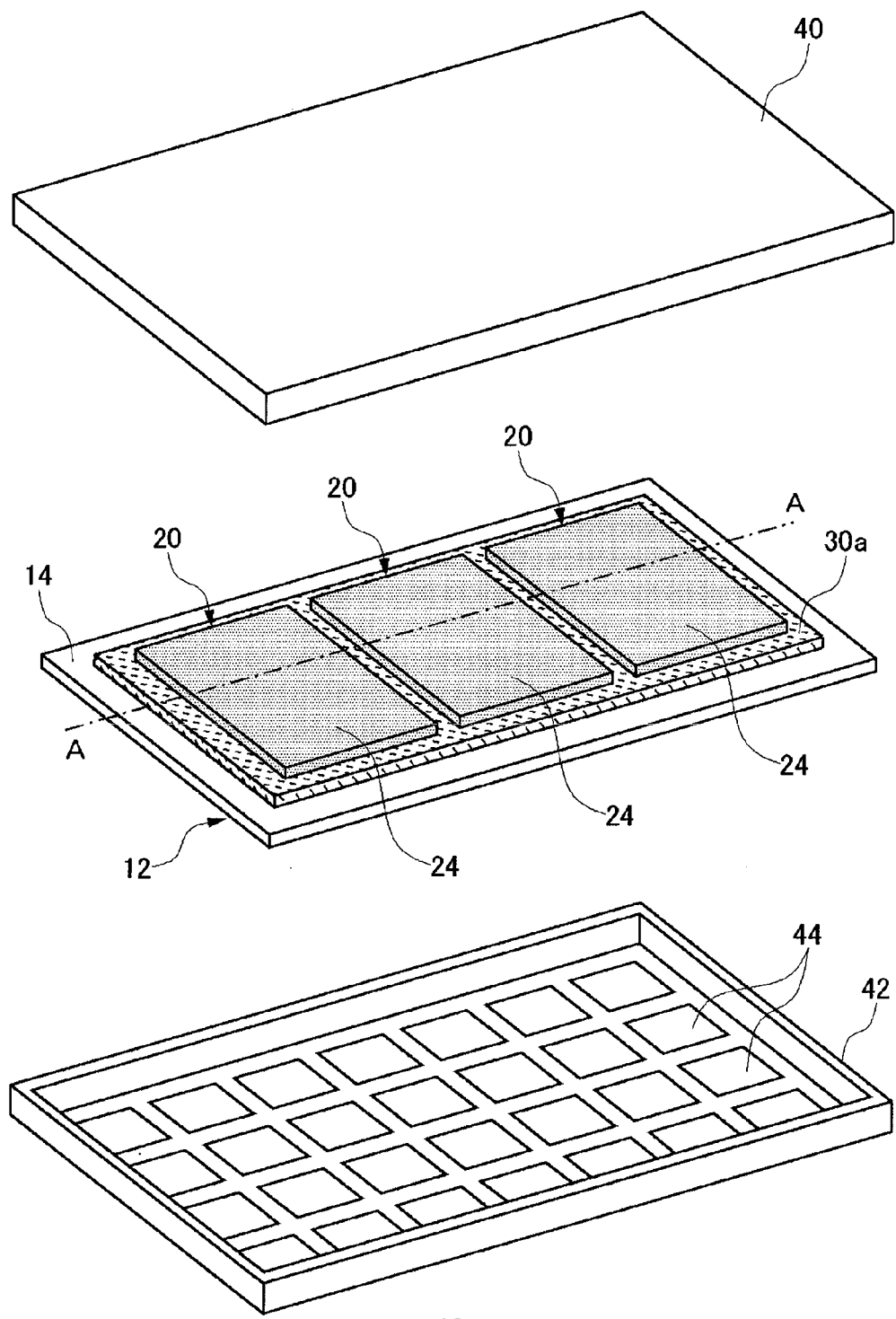
FIG. 1 is an exploded perspective view of a fuel cell according to a first embodiment of the present invention.

The invention will now be described by reference to the preferred embodiments. This does not intend to limit the scope of the present invention, but to exemplify the invention.

Hereinbelow, the embodiments will be described with reference to the accompanying drawings. Note that in all of the Figures the same reference numerals are given to the same components and the description thereof is omitted as appropriate.

First Embodiment

Figure 2:
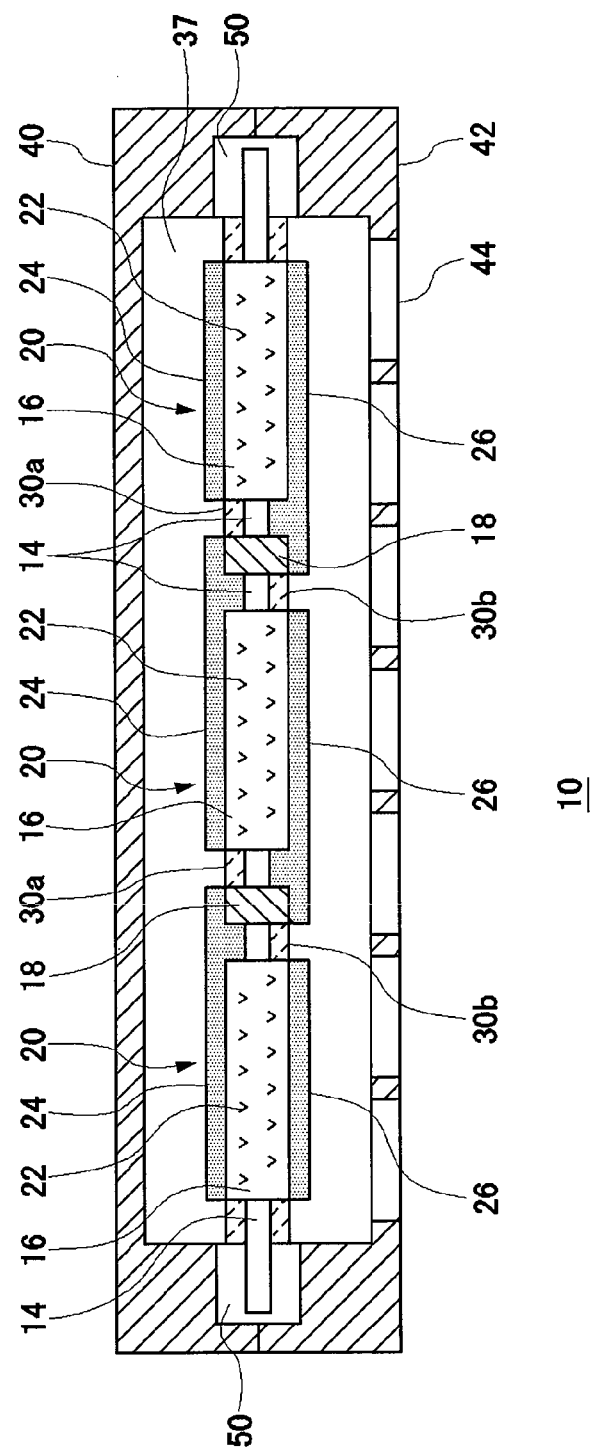
FIG. 2 is a cross-sectional view taken along the line A-A of FIG. 1.

FIG. 1 is an exploded perspective view of a fuel cell according to a first embodiment of the present invention. FIG. 2 is a cross-sectional view thereof taken along the line A-A of FIG. 1. As shown in FIG. 1 and FIG. 2, a fuel cell 10 includes a composite membrane 12 into which membrane electrode assemblies (MEA, also called a catalyst coated membranes (CCM)) 20 are incorporated, an anode housing 40, and a cathode housing 42. A sealing member 50 (described later) is provided around the peripheral edge part of the composite membrane 12.

The composite membrane 12 includes a substrate (base material) 14 and a plurality of membrane electrode assemblies 20.

The substrate 14 is formed of an insulating material such as polyacrylate. Openings 16 the number of which is equal to the number of membrane electrode assemblies 20 are provided in the substrate 14.

Each membrane electrode assembly 20 includes an electrolyte membrane 22, an anode catalyst layer (first catalyst layer) 24 provided on one face of the electrolyte membrane 22, and a cathode catalyst layer (second catalyst layer) 26. The electrolyte membrane 22 is so provided as to fill in the openings 16 provided in the substrate 14. Hydrogen is supplied to the anode catalyst layer 24 as fuel gas. Air is supplied to the cathode catalyst layer 26 as oxidant. Each cell is structured by a pair of anode catalyst layer 2 and cathode catalyst layer with the electrolyte membrane 22 held between the anode catalyst layer 24 and the cathode catalyst layer 26. Each cell generates electric power through an electrochemical reaction between hydrogen and oxygen in the air.

As described above in conjunction with FIG. 1 and FIG. 2, in the fuel cell 10 according to the present embodiment comprises a plurality of cells, the respective pairs of the anode catalyst layers 24 and the cathode catalyst layers 26 constitute a plurality of cells formed in a planar arrangement.

A plurality of interconnectors (conductive members) 30 are so provided as to penetrate the substrate 14 between the adjacent membrane electrode assemblies 20. In adjacent cells, the anode catalyst layer 24 covered by the electrolyte membrane 22 of one cell is so provided as to extend to the interconnector 18, and the anode catalyst layer 24 covers the substrate 14 disposed between the interconnector 18 and the electrolyte membrane 22 of one cell and connects to the interconnector 18. Also, in the adjacent cells, the cathode catalyst layer 26 covered by the electrolyte membrane 22 of the other cell is so provided as to extend to the interconnector 18, and the cathode catalyst layer 26 covers the substrate 14 disposed between the interconnector 18 and the electrolyte membrane 22 of the other cell and connects to the interconnector 18. The interconnector 18 is formed of a conductive material such as carbon. By employing the above-described structure, the adjacent cells are connected in series with each other.

The electrolyte membrane 22, which may show excellent ion conductivity in a moist, or humidified, condition, functions as an ion-exchange membrane for the transfer of protons between the anode catalyst layer 24 and the cathode catalyst layer 26. The electrolyte membrane 22 is formed of a solid polymer material such as a fluorine-containing polymer or a nonfluorine polymer. The material that can be used is, for instance, a sulfonic acid type perfluorocarbon polymer, a polysulfone resin, a perfluorocarbon polymer having a phosphonic acid group or a carboxylic acid group, or the like. An example of the sulfonic acid type perfluorocarbon polymer is a Nafion ionomer dispersion (made by DuPont: registered trademark). Also, an example of the nonfluorine polymer is a sulfonated aromatic polyether ether ketone, polysulfone or the like.

The cathode catalyst layer 24 and the anode catalyst layer 26 are each provided with ion-exchange resin and catalyst particles or carbon particles as the case may be.

The ion-exchange resin contained in the anode catalyst layer 24 and the cathode catalyst layer 26 plays a role of promoting adhesion between the catalyst particles and the electrolyte membrane 22 and also a role of transferring protons between the catalyst particles and the electrolyte membrane 22. The ion-exchange resin may be formed of a polymer material similar to that of the electrolyte membrane 22. A catalyst metal may be a single element or an alloy of two or more elements selected from among Sc, Y, Ti, Zr, V, Nb, Fe, Co, Ni, Ru, Rh, Pd, Pt, Os, Ir, lanthanide series element, and actinide series element. Furnace black, acetylene black, ketjen black, carbon nanotube or the like may be used as the carbon particle when a catalyst is to be supported.

Note that in the ion-exchange resin contained in the anode catalyst layer 24 and the cathode catalyst layer 26, the number of C—F bonds thereof may be smaller than the number of C—F bonds of resin contained in the substrate 14 as in the case of a hydrocarbon-series ion-exchange resin.

The anode housing 40 forms a fuel storage 37 for storing the fuel. A fuel supply port (not shown) is formed in the anode housing 40, so that the fuel can be supplied as needed from a fuel cartridge or the like.

On the other hand, the cathode housing 42 is provided with air inlets 44 for feeding air from outside.

The anode housing 40 and the cathode housing 42 may be fastened to each other by fasteners (not shown), such as bolts and nuts, via sealing members 50 provided along a peripheral edge part of the composite membrane 12. The fasteners giving pressure to the sealing members 50 may improve the sealing performance of the sealing member 50.

In the composite membrane 12 according to the present embodiment, an insulating protective layer 30a is provided around the anode catalyst layer 24, particularly on the substrate 14 between the adjacent anode catalyst layers 24. Also, an insulating protective layer 30b is provided around the cathode catalyst layer 26, particularly on the substrate 14 between the adjacent cathode catalyst layers 26. Hereinafter, the protective layers 30a and 30b may be collectively referred to as "protective layer 30" also. For example, polyimide, Nafion ionomer dispersion or the like may be used as the protective layer 30.

The protective layer 30 enhances the insulation property between the adjacent membrane electrode assemblies 20. As a result, even if the interval between the adjacent electrode membrane assemblies 20, namely the interval between the adjacent cells, is narrowed, the occurrence of shorts between the adjacent cells will be suppressed.

(Fabrication Method of Composite Membrane)

A method for fabricating a composite membrane 12 used for a fuel cell according to the first embodiment will now be described with reference to FIG. 3A(i) to FIG. 7A(ii). FIG. 3A(i) to FIG. 7A(ii) are process diagrams showing a method for manufacturing a membrane electrode assembly 12 according to the first embodiment. In FIG. 3A(i) to FIG. 7A(ii), diagrams on the left (i) show plan views whereas those on the right (ii) show cross-sectional views taken along the line A-A of the respective plan views.

As shown in FIG. 3A, a substrate 14 is first prepared. The thickness of the substrate 14 is about 20 to about 150 μm. The substrate 14 is formed of a polyacrylate, for instance.

Then, as shown in FIG. 3B, a plurality of openings 16 and openings 17 are provided in the substrate 14. An opening 17 is formed between adjacent openings 16. The interval between the opening 16 and the opening 17 is 500 μm or less. The openings 16 and 17 may be formed by, for example, a laser processing using infrared laser, visible-light laser or ultraviolet laser, a punching method using a metallic mode, or the like.

As shown in FIG. 4A and FIG. 4B, in parallel with the preparation of the substrate 14, a protective layer 30a and a protective layer 30b are prepared. The protective layer 30a has openings 31a in regions corresponding to the anode catalyst layers. On the other hand, the protective layer 30b has openings 31b in regions corresponding to the cathode catalyst layers. As a method for fabricating the protective layers 30a and 30b, openings may be provided in a sheet-like protective layer using laser or metallic mold, for example.

Then, as shown in FIG. 5A, the protective layer 30a is overlapped on one face of the substrate 14 (i.e., an anode forming side of the substrate 14), and the protective layer 30b is overlapped on the other face of the substrate 14 (i.e., a cathode forming side of the substrate 14). After this, the protective layers 30a and 30b are adhered to the substrate 14 using a hot-press method or the like. Though, in this fabrication method, a procedure is used where the protective layer 30 in which openings have been formed in advance is laminated onto the substrate 14, a procedure may be applicable where a resin constituting the protective layer is applied to the substrate 14 by a spraying method or the like.

Then, as shown in FIG. 5B, an electrolyte membranes 22 are formed in the openings 16 (see FIG. 5A) provided in the substrate 14. More specifically, the openings 16 are filled with Nafion dispersion solution and then the solvent is evaporated to form the electrolyte membranes 22. This method proves effective when the openings 16 are in microscale. Also, the electrolyte membranes 22 molded and formed beforehand in accordance with the size of the openings may be fit into the openings 16. In such a case, it is preferable that the Nafion dispersion solution be poured into the interface between the substrate 14 and the electrolyte membrane 22 after the electrolyte membranes 22 has been fit into the openings 16. Since the Nafion dispersion solution functions as an adhesive here, the adhesion between the substrate 14 and the electrolyte membrane 22 can be enhanced.

Then, as shown in FIG. 6A, a paste such as carbon paste is filled into the openings 17 (see FIG. 5B) provided in the substrate 14. The paste filled into the openings 17 is dried to form interconnectors 18.

Then, as shown in FIG. 6B, at the side of one face of the substrate 14, a catalyst layer 80 is formed along a longitudinal direction of the substrate 14 in such a manner as to lie across a plurality of electrolyte membranes 22. More specifically, a catalyst slurry is adjusted by sufficiently stirring the water of 10 g, Nafion dispersion solution of 5 g, platinum black or platinum-supporting carbon of 5 g and 1-propanol of 5 g. And the catalyst layer 80 is formed by spray-coating this catalyst slurry. Similarly, at the side of the other face of the substrate 14, a catalyst layer 82 is formed along a longitudinal direction of the substrate 14 in such a manner as to lie across a plurality of electrolyte membranes 22. Specifically, the catalyst layer 82 is formed by spray-coating this catalyst slurry.

Figure 7:
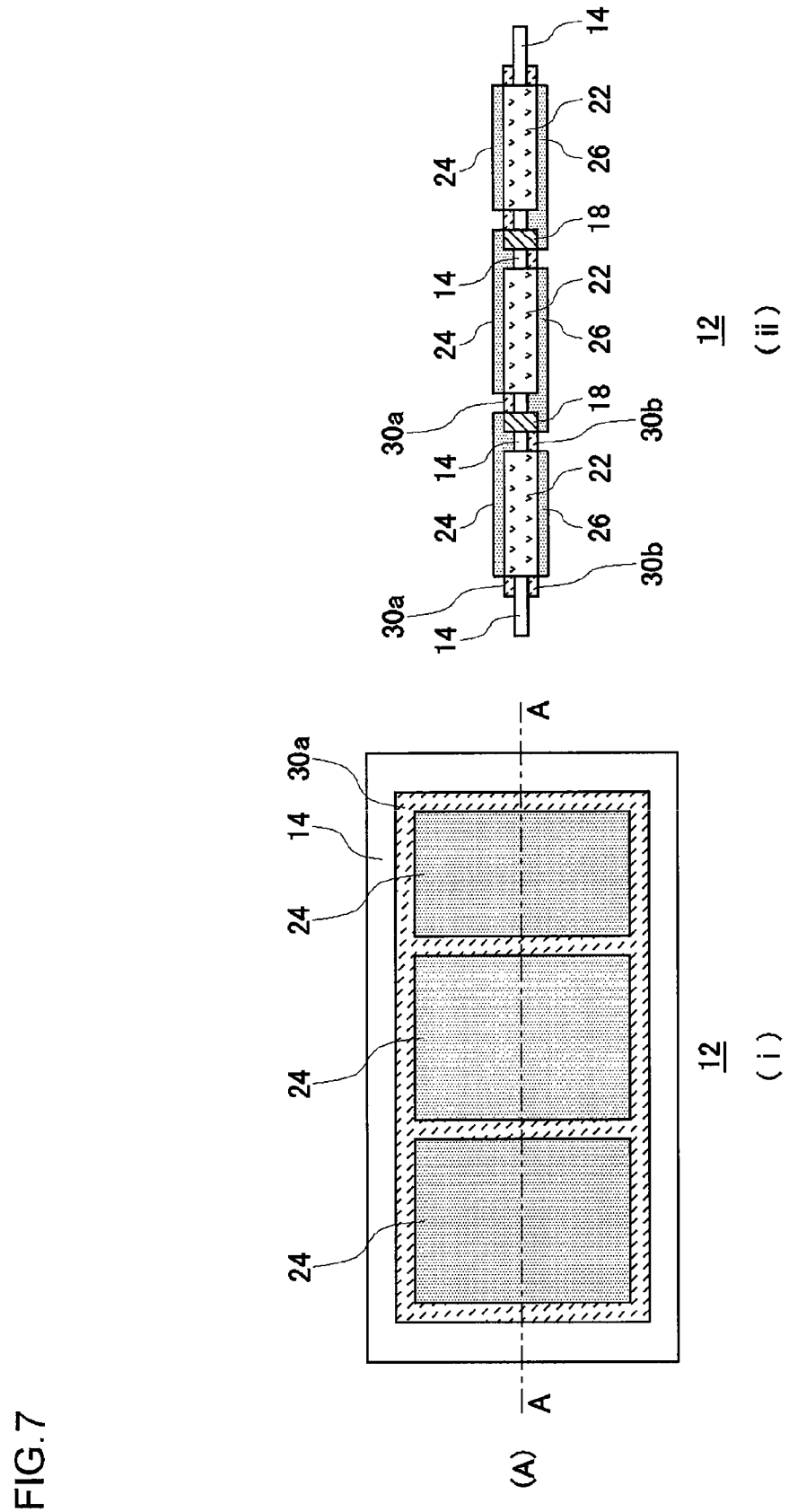
FIGS. 7A(i) and 7A(ii) are process diagrams showing a fabrication method of a composite membrane used for a fuel cell according to a first embodiment.

Then, as shown in FIG. 7A, a predetermined region of the catalyst layer 80 provided at the side of one face of the substrate 14, namely the catalyst layer 80 corresponding to the protective layer 30a disposed in a region held between the adjacent electrolyte membranes 22, is partially removed using laser beams such as excimer laser. Here, the width of the predetermined region of the catalyst layer 80 to be removed is preferably in the range of 1 to 500 μm and more preferably in the range of 50 to 200 μm. This removal of the predetermined regions thereof segmentalizes the catalyst layer 80 and exposes the protective layer 30a in the region held between the adjacent electrolyte membrane 22, thereby forming the anode catalyst layers 24.

Also, a predetermined region of the catalyst layer 82 provided at the side of the other face of the substrate 14, namely the catalyst layer 82 corresponding to the protective layer 30b disposed in a region held between the adjacent electrolyte membranes 22, is partially removed using laser beams such as excimer laser. Here, the width of the predetermined region of the catalyst layer 82 to be removed is preferably in the range of 1 to 500 μm and more preferably in the range of 50 to 200 μm. This removal of the predetermined regions thereof segmentalizes the catalyst layer 82 and exposes the protective layer 30b in the region held between the adjacent electrolyte membrane 22, thereby forming the cathode catalyst layers 26.

YAG third harmonic laser, $YVO_4$ fourth harmonic green laser or the like whose oscillation wavelength is greater than or equal to 180 nm and less than or equal to 550 nm may be used as laser for the removal of the catalyst layer, in place of the excimer laser. The level of the output of laser is preferably such that the predetermined regions of the catalyst layers to be irradiated with the laser can be completely removed thereby. And it is preferable that the output of laser is adjusted as appropriate in accordance with the material and/or thickness of the catalyst layer.

According to this fabrication method and structure, the substrate 14 is protected by the protective layer 30a when the catalyst layer 80 is partially removed using the laser processing. Thus, the deterioration in the substrate 14 is suppressed. Also, the substrate 14 is protected by the protective layer 30b when the catalyst layer 82 is partially removed using the laser processing, so that the deterioration in the substrate 14 is suppressed.

Thus, the composite membrane 12, into which the membrane electrode assemblies 20 are incorporated, according to the first embodiment are manufactured through the above-described processes. Though both the anode and the cathode are subjected to the similar process in each process of the above-described manufacturing processes and then a subsequent process is performed, the anode may be subjected to a series of processes and then the cathode may be subjected to a series of processes, for example. Also, the process of forming the protective layer 30 may be done after the substrate 14 has been filled beforehand with the electrolyte membrane 22.

Where the protective layer 30 is formed by the laser processing as described above, characteristics desired in the protective layer 30 are listed as follows ((1) to (4)).

(1) It is desirable that a fluorine-containing polymer be used as the protective layer 30 and the number of C—F bonds in the fluorine-containing polymer contained in the protective layer 30 be larger than the number of C—F bonds contained in the substrate 14. Here, the number of C—F bonds indicates the number of C—F bonds present per unit weight, and can be evaluated using a X-ray photoelectron spectroscopy (XPS), for instance. Note that the bonding energy of the C—F bond is higher than the energy of excimer laser (wavelength: 248 nm) used for the laser processing and therefore the larger the number of C—F bonds becomes, the less likely the structural alteration due to the excimer laser will be caused.

More specifically, when Nafion ionomer dispersion is used for the protective layer 30, the substrate 14 whose number of C—F bonds is smaller than that in the protective layer 30 may be polyimide or the like, for instance.

According to this fabrication method and structure, molecules that constitute the protective layer 30a is less likely to be subject to the structural alteration even if the protective layer 30a is irradiated with laser when the catalyst layer 80 is to be partially removed using the laser processing. Also, molecules that constitute the protective layer 30b is less likely to subject to the structural alteration even if the protective layer 30b is irradiated with laser when the catalyst layer 80 is partially removed using the laser processing.

It is desirable that the number of C—F bonds in the ionomer contained in the catalyst layer 80 or the catalyst layer 82 be smaller than that in the fluorine-containing polymer contained in the protective layer 30. This facilitates the laser processing of the catalyst layer 80 and the catalyst layer 82 and therefore the processing accuracy of the anode catalyst layer 24 and the cathode catalyst layer 26 improves.

(2) It is desirable that the thermal resistance of the protective layer 30 is higher than that of the substrate 14. The protective layer 30 having such a property may be phenol resin and polyimide, for instance.

According to this fabrication method and structure, the protective layer 30a is less likely to deteriorate even if the protective layer 30a is irradiated with laser when the catalyst layer 80 is to be partially removed using the laser processing. Also, the protective layer 30b is less likely to deteriorate even if the protective layer 30b is irradiated with laser when the catalyst layer 82 is to be partially removed using the laser processing.

(3) It is desirable that the protective layer 30 has a smaller thermal conductivity than that of the substrate 14. Such the protective layer 30 may be polyimide and cellulose, for instance.

According to this fabrication method and structure, heat is less likely to transfer to the substrate 14 through the protective layer 30a when the catalyst layer 80 is to be partially removed using the laser processing, so that the deterioration of the substrate 14 is suppressed. Also, heat is less likely to transfer to the substrate 14 through the protective layer 30b when the catalyst layer 82 is to be partially removed using the laser processing, so that the deterioration of the substrate 14 is suppressed.

It is desirable that the protective layer 30 has a lower laser beam transmission factor of laser beams used for microfabrication of the catalyst layer than that of the substrate 14. If the oscillation wavelength of laser is in the range of 180 nm to 550 nm, polyimide, sulfonated polyimide, polycarbonate, methacryl resin or the like may be used for such the protective layer 30 that cuts off such laser beams. According to this fabrication method and structure, blocking the laser beams, used for microfabrication of the catalyst layer, by the protective layer 30a can prevent the laser beams from transmitting through the substrate 14 and removing the catalyst layer 82, when the catalyst layer 80 is to be partially removed using the laser processing. Also, blocking the laser beams, used for microfabrication of the catalyst layer, by the protective layer 30b can prevent the laser beams from transmitting through the substrate 14 and removing the catalyst layer 80, when the catalyst layer 82 is to be partially removed using the laser processing.

Second Embodiment

Figure 8:
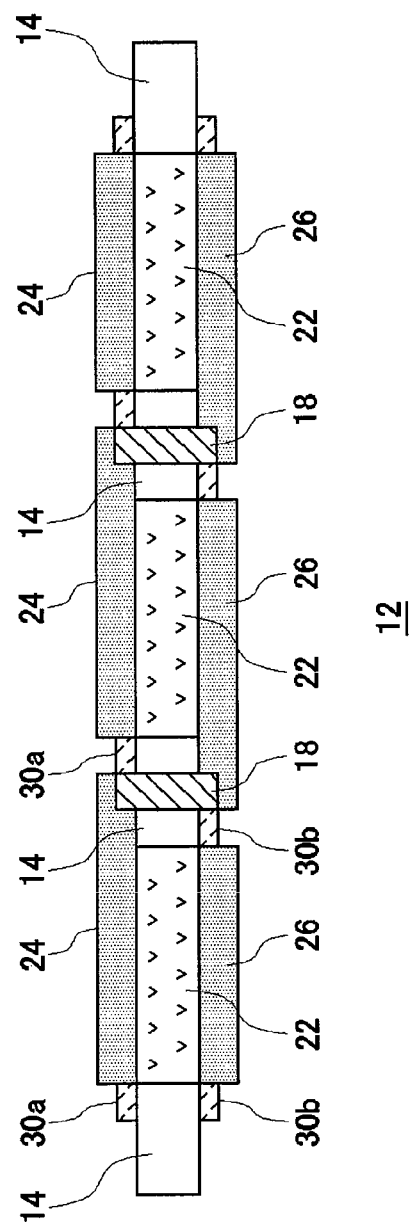
FIG. 8 is a cross-sectional view showing a structure of a composite membrane used for a fuel cell according to a second embodiment of the present invention.

FIG. 8 is a cross-sectional view showing a structure of a composite membrane 12 used for a fuel cell according to a second embodiment of the present invention. The basic structure of the composite membrane 12 according to the second embodiment is the same as the structure of the first embodiment. A description is given hereinbelow of the composite membrane 12 according to the second embodiment centering around a structure different from that of the first embodiment.

In the composite membrane 12 according to the second embodiment, the thickness of the electrolyte membrane 22 is equal to the thickness of the substrate 14. As a result, the shape of the electrolyte membrane 22 is easily maintained by the substrate 14 and therefore any deformation of the electrolyte membrane 22 is suppressed.

(Fabrication Method of Composite Membrane)

A method for manufacturing a composite membrane 12 used for a fuel cell according to the first embodiment will now be described with reference to FIG. 9A(i) to FIG. 11A(ii). FIG. 9A(i) to FIG. 11A(ii) are process diagrams showing a method for manufacturing a membrane electrode assembly 12 according to the second embodiment. In FIG. 9A(i) to FIG. 11A(ii), diagrams on the left (i) show plan views whereas those on the right (ii) show cross-sectional views taken along the line A-A of the respective plan views.

Similar to the fabrication method of the composite membrane according to the first embodiment, a substrate 14 and protective layers 30a and 30b are first prepared (see FIGS. 3A(i) to 3B(ii) and FIGS. 4A(i) to 4B(ii). Note that the thickness of the substrate 14 is equal to the thickness of the electrolyte membrane described later.

Then, as shown in FIG. 9A, the electrolyte membranes 22 are formed in the openings 16 (see FIG. 3B) provided in the substrate 14. A method for forming the electrolyte membranes 22 is similar to that described in conjunction with FIG. 5B.

Then, as shown in FIG. 9B, the protective layer 30a is overlapped on one face of the substrate 14 (i.e., an anode forming side of the substrate 14), and the protective layer 30b is overlapped on the other face of the substrate 14 (i.e., a cathode forming side of the substrate 14). After this, the protective layers 30a and 30b are adhered to the substrate 14 using the hot-press method or the like.

Figure 10A:
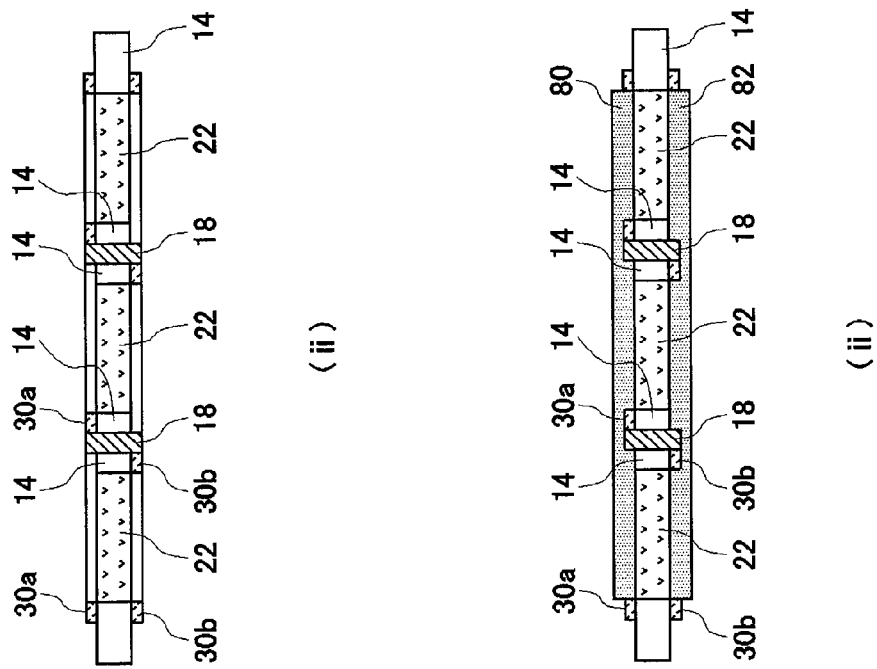
FIGS. 10A(i) to 10B(ii) are process diagrams showing a fabrication method of a composite membrane used for a fuel cell according to a second embodiment.

Then, as shown in FIG. 10A, a paste such as carbon paste is filled into the openings 17 (see FIG. 3B) provided in the substrate 14. After the paste has been filled, the paste is dried to form interconnectors 18.

Figure 10B:
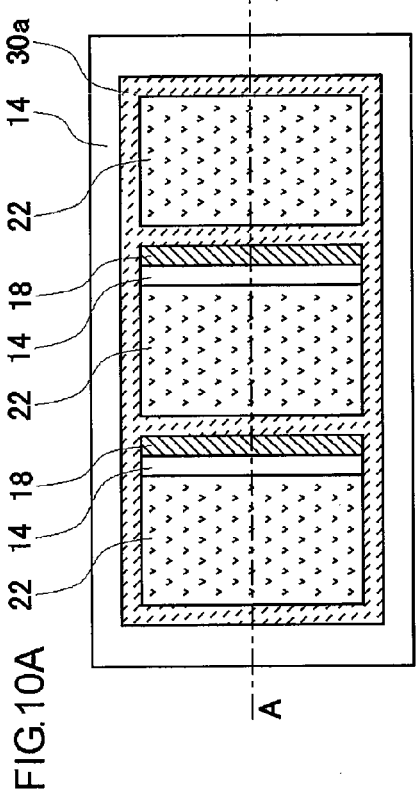

Then, as shown in FIG. 10B, at the side of one face of the substrate 14, a catalyst layer 80 is formed along a longitudinal direction of the substrate 14 in such a manner as to lie across a plurality of electrolyte membranes 22. Similarly, at the side of the other face of the substrate 14, a catalyst layer 82 is formed along a longitudinal direction of the substrate 14 in such a manner as to lie across a plurality of electrolyte membranes 22.

Figure 11:
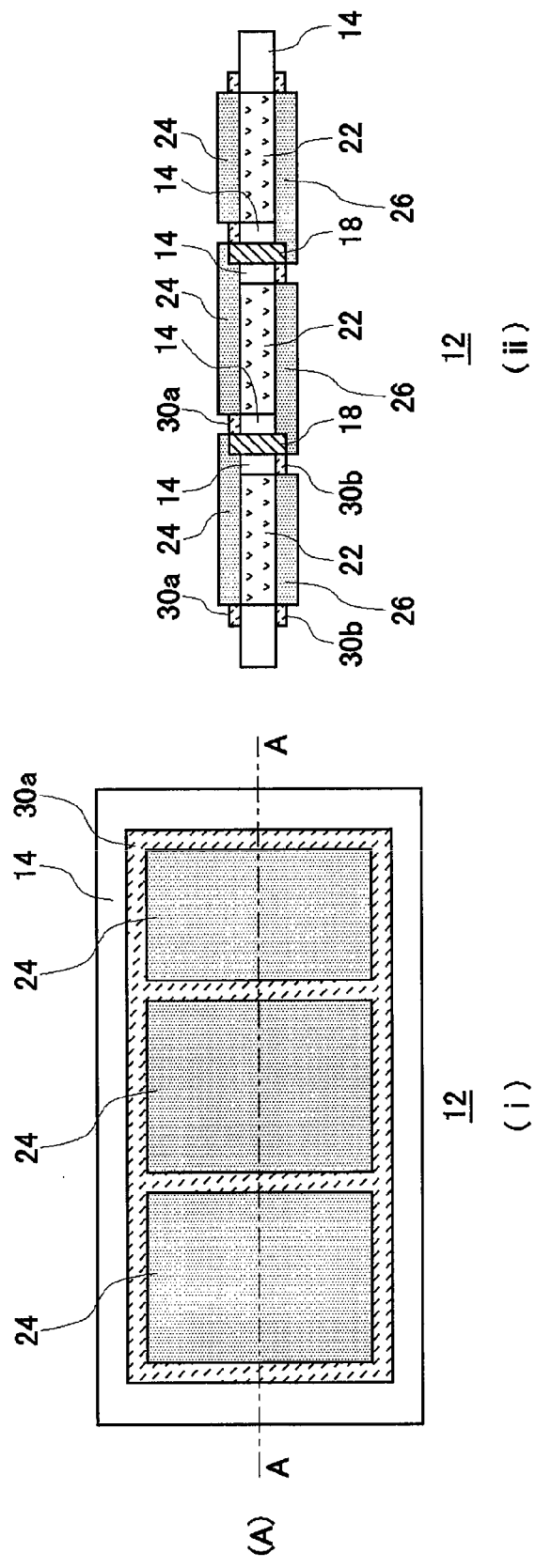
FIGS. 11A(i) and 11A(ii) are process diagrams showing a fabrication method of a composite membrane used for a fuel cell according to a second embodiment.

Then, as shown in FIG. 11A, a predetermined region of the catalyst layer 80 provided at the side of one face of the substrate 14, namely the catalyst layer 80 corresponding to the protective layer 30a disposed in a region held between the adjacent electrolyte membranes 22, is partially removed using laser beams such as excimer laser. This removal of the predetermined regions thereof segmentalizes the catalyst layer 80 and exposes the protective layer 30a in the region held between the adjacent electrolyte membrane 22, thereby forming the anode catalyst layers 24.

Also, a predetermined region of the catalyst layer 82 provided at the side of the other face of the substrate 14, namely the catalyst layer 82 corresponding to the protective layer 30b disposed in a region held between the adjacent electrolyte membranes 22, is partially removed using laser beams such as excimer laser. This removal of the predetermined regions thereof segmentalizes the catalyst layer 82 and exposes the protective layer 30b in the region held between the adjacent electrolyte membrane 22, thereby forming the cathode catalyst layers 26.

Thus, the composite membrane 12, into which the membrane electrode assemblies 20 are incorporated, according to the second embodiment are manufactured through the above-described processes. Similarly to the first embodiment, according to the second embodiment, the substrate 14 is also protected by the protective layer 30a when the catalyst layer 80 is partially removed using the laser processing. Thus, the deterioration in the substrate 14 is suppressed. Also, the substrate 14 is protected by the protective layer 30b when the catalyst layer 82 is partially removed using the laser processing, so that the deterioration in the substrate 14 is suppressed.

(Experiment 1: Measurement of Light Transmittance)

Polyimide is used as the protective layer, and the transmittance (%) for films labeled as samples 1 to 5 having different film thickness is measured in the range between 190 nm and 550 nm using a spectrophotometer (Hitachi U-3010). Among them, the measurement results of transmittance in the laser wavelengths typically at 532 nm, 355 nm and 248 nm are shown in Table 1. Sample 3 is one with Sample 1 and Sample 2 overlapped. Note that, for example, $YVO_4$ fourth harmonic green laser (532 nm), YAG third harmonic laser (355 nm), KrF excimer laser (wavelength: 248 nm) or the like may be used as a commonly-used laser.

TABLE 1

| SAMPLE NAME | MATERIAL | MANUFACTURER | BRAND NAME | MODEL NUMBER | FILM THICKNESS (um) | LASER WAVELENGTH (nm) 532 TRANSMITTANCE (%) | 355 | 248 |
|---|---|---|---|---|---|---|---|---|
| SAMPLE 1 | POLY-IMIDE | TORAY-DUPONT | KAPTON | 50H | 12.5 | 69 | 0 | 0 |
| SAMPLE 2 | | | | 100H | 25 | 48 | 0 | 0 |
| SAMPLE 3 | | | | 50H + 100H | 37.5 | 35 | 0 | 0 |
| SAMPLE 4 | | | | 200H | 50 | 23 | 0 | 0 |
| SAMPLE 5 | | | | 500H | 125 | 2 | 0 | 0 |

(Experiment 2: Functional Evaluation of Protective Layer)

Figure 12:
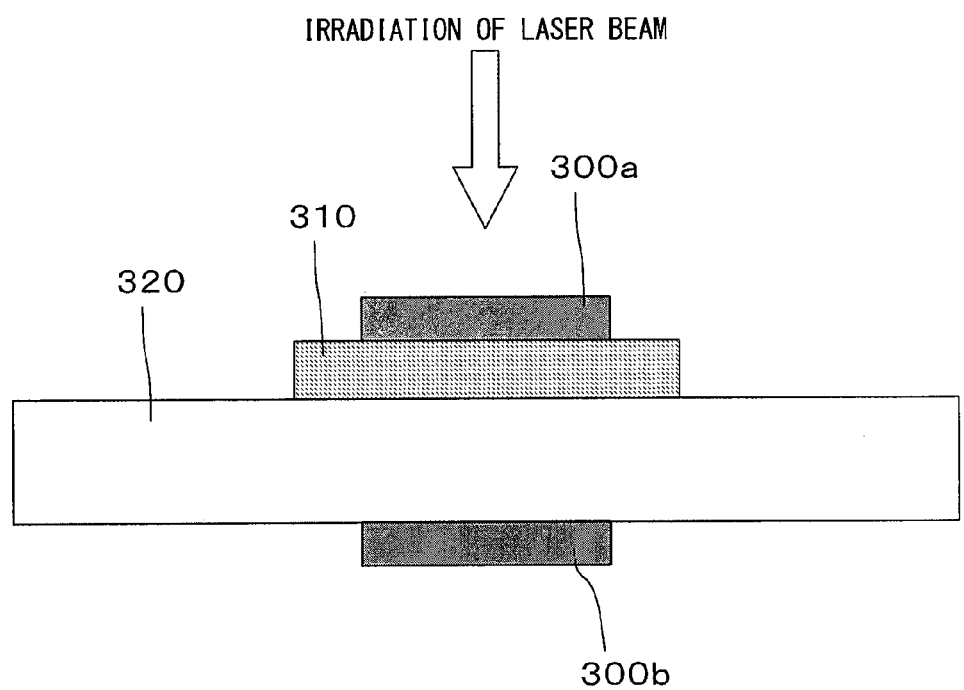
FIG. 12 is a diagram schematically showing a composite membrane used for the evaluation of a protective layer.

The following experiments were conducted to see if each of sample 1 to sample 5 functions as a protective layer. FIG. 12 is a diagram schematically showing a composite membrane used for the evaluation of a protective layer. Each film of sample 1 to sample 5 is adhered to one side of a substrate 320, made of polyacrylate having the thickness of 50 μm, as a protective film 310, whereas a catalyst layer 300a and a catalyst layer 300b are formed in the surface of the protective film 310 and on the other side of the substrate 320, respectively. Similar to FIG. 6B, the catalyst layers 300a and 300b can be fabricated by spray-coating the catalyst slurry. The catalyst layer 300a having the thickness of about 5 μm formed on the film of the protective layer 310 is removed using the green laser whose wavelength is 532 nm. After the laser processing, the side (catalyst layer 300a) irradiated with the laser beams and the catalyst layer 300b disposed opposite to said side irradiated with the laser beams are verified if the catalyst is removed or not. In Table 2, "o" (circle) indicates that the catalyst is not removed and "x" (cross) indicates that the catalyst has been removed.

TABLE 2

| SAMPLE NAME | PROCESSED RESULT |
|---|---|
| SAMPLE 1 | N/A |
| SAMPLE 2 | N/A |

TABLE 2-continued

| SAMPLE NAME | PROCESSED RESULT |
|---|---|
| SAMPLE 3 | N/A |
| SAMPLE 4 | YES |
| SAMPLE 5 | YES |

It is found from the results in Table 2 that films whose transmittance is 23% or below in the wavelength of 532 nm function as the protective layer.

(Experiment 3: Inspection of the Type of Conductive Layer)

Next, a plurality of types of materials as shown in Table 3 are selected as the protective layer, and the transmittance (%) for films labeled as samples 6 to 12 is measured, similarly to the experiment 1, in the range between 190 nm and 550 nm. As a result of the experiment 3, it is speculated that sample 10 and sample 11 having the thickness used in this experiment 3 in the wavelength of 532 nm function as the protective layers and the other samples function as protective layers if the thickness thereof is made larger than that used in this experiment 3.

TABLE 3

| SAMPLE NAME | MATERIAL | MANUFACTURER | BRAND NAME | MODEL NUMBER | FILM THICKNESS (um) | LASER WAVELENGTH (nm) 532 TRANSMITTANCE (%) | 355 | 248 |
|---|---|---|---|---|---|---|---|---|
| SAMPLE 6 | ULTRA-HIGH MOLECULAR WEIGHT POLY-ETHYLENE | SAXIN CORP. | INNOVATE | ML501 | 50 | 42 | 34 | 23 |
| SAMPLE 7 | | | | ML301 | 32 | 46 | 39 | 30 |
| SAMPLE 8 | POLY-IMIDE + SILICA | ARAKAWA CHEMICAL INDUSTRIES, LTD. | POMIRAN | T38 | 38 | 49 | 0 | 0 |
| SAMPLE 9 | | | | N38 | 38 | 48 | 0 | 0 |
| SAMPLE 10 | POLY-ETHER-IMIDE | ASAHI GLASS CO., LTD. | ULTEM | WH217 | 50 | 0 | 0 | 0 |
| SAMPLE 11 | | | | 1000B-71082 | 76 | 0 | 0 | 0 |
| SAMPLE 12 | | | | 1000B-1000 | 76 | 45 | 0 | 0 |

The present invention is not limited to the above-described embodiments only, and it is understood by those skilled in the art that various modifications such as changes in design may be made based on their knowledge and the embodiments added with such modifications are also within the scope of the present invention.

In each of the above-described embodiments, such protective layers as described above are provided between the catalyst layers on both the anode side and the cathode side of the substrate. However, this should not be considered as limiting and, for example, such a protective layer as described above may be provided between the catalyst layers on only one of the anode side and the cathode side of the substrate.

Also, in each of the above-described embodiments, the substrate and the protective layer are separate members. However, the members constituting the substrate and the protective layer may be formed of the same material, and the substrate and the protective layer may be formed integrally with each other. According to this modification, the number of components used in the composite membrane is reduced, so that the manufacturing cost can be reduced.

What is claimed is:

1. A composite membrane, comprising:
   an insulating substrate having a plurality of openings;
   a membrane electrode assembly, disposed in each of said plurality of openings, having an electrolyte membrane containing ionomer, a first catalyst layer provided on one face of the electrolyte membrane, and a second catalyst layer provided on the other face of the electrolyte membrane; and
   an insulating protective layer provided, for each membrane electrode assembly, on at least one of a first catalyst layer side of said substrate in between the adjacent first catalyst layers and a second catalyst layer side, disposed counter to the first catalyst layer side, of said substrate in between the adjacent second catalyst layers, wherein said protective layer has a lower transmission factor of laser beams used for microfabrication of the catalyst layers than that of the substrate.

2. A composite membrane according to claim 1, wherein said protective layer contains a resin whose number of C—F bonds is greater than that of said substrate.

3. A composite membrane according to claim 1, wherein said protective layer is made of a resin for which the transmission factor of laser beams used for microfabrication of the catalyst layers is 23% or less.

4. A composite membrane according to claim 2, wherein said protective layer is made of a resin for which the transmission factor of laser beams used for microfabrication of the catalyst layers is 23% or less.

5. A composite membrane according to claim 2, wherein said protective layer has a lower transmission factor of laser beams used for microfabrication of the catalyst layers than that of the substrate.

6. A composite membrane according to claim 3, wherein said protective layer has a lower transmission factor of laser beams used for microfabrication of the catalyst layers than that of the substrate.

7. A fuel cell having a composite membrane according to claim 1.

8. A fuel cell having a composite membrane according to claim 2.

9. A fuel cell having a composite membrane according to claim 3.

10. A fuel cell having a composite membrane according to claim 1.

* * * * *